March 30, 1965  A. KUSKO  3,176,215

CONSTANT CURRENT REGULATOR

Filed June 21, 1962

INVENTOR
ALEXANDER KUSKO
BY
Robertson Smythe
ATTORNEYS

United States Patent Office 3,176,215
Patented Mar. 30, 1965

3,176,215
CONSTANT CURRENT REGULATOR
Alexander Kusko, Newton Center, Mass., assignor to Basic Products Corporation, Milwaukee, Wis., a corporation of Wisconsin
Filed June 21, 1962, Ser. No. 204,172
1 Claim. (Cl. 323—24)

This invention relates to static electric regulators and especially to a constant current regulator arrangement which can be used for various purposes, particularly airport lighting.

In airport lighting systems, it is necessary to regulate current so as to maintain it constant. The lamp in the system may be damaged by current variations. Such also is true in other similar systems where the current must be kept contsant. In prior arrangements, the current sensing means has not provided a correct measure of the R.M.S. or effective current.

One of the principal objects of the invention is to provide an arrangement wherein the effective current voltage or power to the load is employed for controlling a static controller.

In one aspect of the invention, a power modulator, such as a silicon controlled rectifier means, is placed between the A.C. input and A.C. output of the circuit. A conversion device, such as a Hall effect sensing device, is in the circuit between the power modulator and the output. A control circuit comparison and amplifying arrangement is connected to a reference signal and to the power modulator. In one form, the control circuit can be a magnetic amplifier which provides a signal to the gate terminals of the silicon controlled rectifiers.

These and other objects, advantages and features of the invention will become apparent from the following description and drawings which are merely exemplary.

Figure 1:
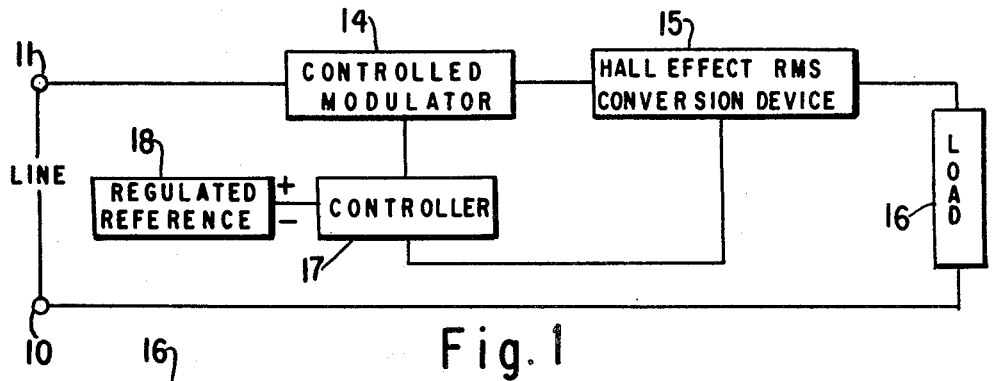
Figure 2:
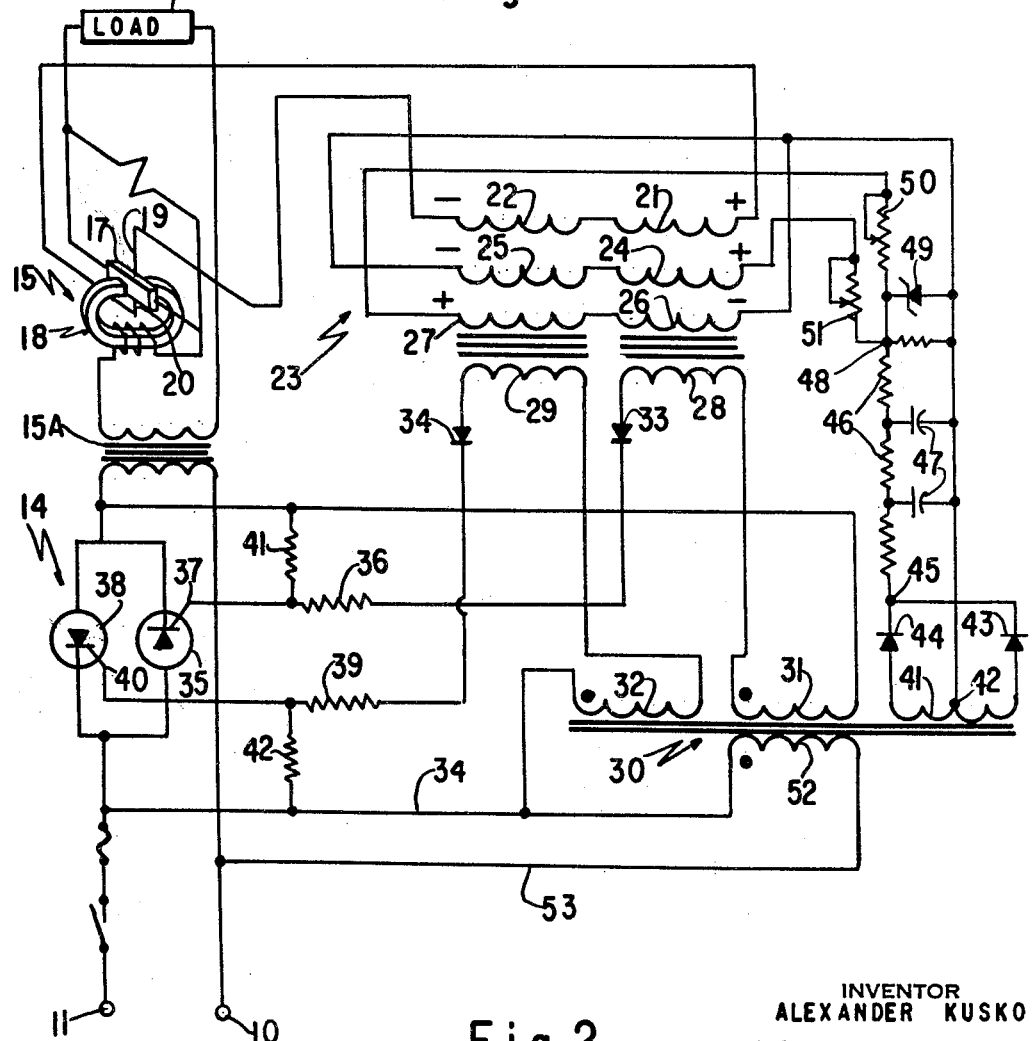

In the drawings:
FIG. 1 is a block diagram showing the invention.
FIG. 2 is a circuit diagram of one form of the invention.

Referring to the block diagram of FIG. 1, A.C. power supply is connected to terminals 10 and 11. A silicon controlled rectifier arrangement 14 is located between the input and a Hall effect sensing means 15 through transformer 15A. Load 16 may be an airport lighting system or other arrangement. The Hall effect sensing means supplies a D.C. signal proportional to the effective value or the R.M.S. value of the load current to the controller 17. The D.C. signal is compared with a signal from the regulated reference 18, and a control signal proportional to the difference between the sensed signal and the reference signal is then applied to the controlled rectifier means 14.

Referring to FIG. 2, A.C. power is introduced from the line to terminals 10 and 11 and it passes through the silicon controlled rectifier shown generally at 14 and to output transformer 15A. The Hall effect current sensing device 15 is between controlled rectifiers 14 and load 16. The controlled rectifiers 14 are controlled in response to the output current as measured by sensing circuits 15 to maintain prescribed values of output current in the face of changes in either load 16 or line voltage applied at 10 and 11. Sensing device 15 consists of a voltage responsive wafer and a magnetic circuit so connected that the Hall current and the magnetic field to which the wafer is subject produces a Hall voltage that is proportional to the instantanous square of the load current. The Hall voltage appearing at terminals 19 and 20 is applied to the control windings 21, 22 of magnetic amplifier 23. Magnetic amplifier 23 also carries bias windings 24, 25 and reference windings 26, 27. The magnetic amplifier 23 also has gate windings 28, 29 which are supplied from transformer 30 by means of individual secondary windings 31, 32, through rectifiers 33, 34.

The output of gate winding 28 of the magnetic amplifier is coupled to silicon controlled rectifier 35 of the controlled rectifier means 14 through series resistor 36 so as to apply a firing pulse to gate terminal 37 of controlled rectifier 35. The output of gate winding 29 is applied to silicon controlled rectifier 38 through series resistor 39 so as to apply a firing pulse to terminal 40. Resistors 41, 42 serve to reduce the value of the firing pulse and also to provide a path for the magnetizing current of the magnetic amplifier gate windings.

Transformer 30 is wound also to have a secondary winding 41 which is center tapped at 42 to supply rectifiers 43, 44, providing an unfiltered direct current at point 45. This unfiltered direct current is fed through the filter network including resistance 46, capacitor 47. Zener diode 49 and vairable resistances 50 and 51 supply the voltage to windings 26, 27 and 24, 25 of the magnetic amplifier 23.

As the load current varies, the time in the half-cycle in which the silicon controlled rectifier starts to conduct will vary, the silicon controlled rectifier starting to conduct when current is applied to the gate. Thus, the load current is controlled.

It should be apparent that details of the invention can be varied without departing from the spirit of the invention except as defined in the appended claims.

What is claimed is:

In an electric regulator the combination including an A.C. input and an A.C. output, silicon controlled rectifier means connected between said input and output, said silicon controlled rectifier means having control means connected therewith, Hall effect conversion means including an R.M.S. measuring means for providing a signal whose value is a measure of the effective value of the output current, reference signal means, magnetic amplifier means connected to said Hall effect conversion means and to said reference signal means to provide a summation signal, said magnetic amplifier means having gate winding means, and means connecting said magnetic amplifier gate winding means with said silicon controlled rectifier control means for controlling the load current.

References Cited by the Examiner
UNITED STATES PATENTS
2,987,666  6/61  Manteuffel _____ 321—25
3,080,517  3/63  Borkovitz _____ 323—66

LLOYD McCOLLUM, *Primary Examiner.*